United States Patent [19]

Gomes et al.

[11] 3,711,386

[45] Jan. 16, 1973

[54] RECOVERY OF METALS BY ELECTRODEPOSITION

[75] Inventors: John M. Gomes; Danny L. Pool; Morton Wong, all of Reno, Nev.

[73] Assignee: The United States of America as represented by the Secretary of the Interior

[22] Filed: Dec. 4, 1969

[21] Appl. No.: 882,272

[52] U.S. Cl. ............................................. 204/64 R
[51] Int. Cl. ............................................. C22d 3/18
[58] Field of Search ..................... 204/64 R, 60, 64 T

[56] References Cited

UNITED STATES PATENTS

| | | | |
|---|---|---|---|
| 3,373,097 | 3/1968 | Gomes et al. | 204/64 R |
| 2,848,395 | 8/1958 | Carignan | 204/60 |
| 3,405,043 | 10/1968 | Barakat et al. | 204/60 |
| 3,450,524 | 6/1969 | Pascaud et al. | 204/64 R X |

Primary Examiner—John H. Mack
Assistant Examiner—Donald R. Valentine
Attorney—Ernest S. Cohen and William S. Brown

[57] ABSTRACT

Metallic elements such as iron, manganese and refractory metals are recovered from ores, slags, silicate residues, etc., by electrodeposition from a melt comprising a chloride phase and a silicate phase. The cathode is submerged in the chloride phase while the anode is in contact with both the chloride and the silicate phases. Borate, phosphate or fluoride salts are added to the melt to promote diffusion of metallic ions from the silicate phase to the chloride phase.

6 Claims, No Drawings

RECOVERY OF METALS BY ELECTRODEPOSITION

Large quantities of slags containing valuable metals such as iron and manganese presently exist and are potential raw materials for recovery of the metals. However, present processing techniques are not economically feasible for recovery of metals from the slags.

Smelting, arc furnace, chloride volatilization and solvent leaching have all been investigated as possible methods for recovery of metals from slags. However, none of these methods have provided an efficient, economic method for recovery of the metal values. In addition, direct electrolysis of silicate melts at temperatures of 1,300° to 1500°C has been investigated. However, this method has also been unsuccessful because (1) silicate melts are poor conductors of electricity, (2) cleaning of insoluble electrolytes from metal deposits was difficult and (3) materials of construction do not hold up well above 1,300°C.

It has now been found, according to the process of the present invention, that metals may be recovered efficiently and economically by electrodeposition from a melt comprising two immiscible liquid phases, i.e., a chloride phase and a silicate phase. In the practice of the invention the cathode is submerged only in the chloride phase, normally the upper phase, while the anode is in contact with both the chloride and the lower silicate phase. The temperature of the melt during electrodeposition is maintained between about 1,000° and 1,300°C, preferably between 1,000° and 1,100°C. The upper chloride phase serves as the electrolyte, molten chlorides being good electrical conductors. In addition, most chloride salts are water-soluble, thus facilitating their removal from the dendritic deposits of metal on the cathode.

If the metal-containing raw material, i.e., ore, slag, etc., is siliceous in nature, the two phase melt of the invention is prepared by simply adding an alkali metal chloride, preferably sodium chloride, to the siliceous raw material and heating to the desired electrodeposition temperature. If the metal-containing raw material is nonsiliceous, the melt is prepared by mixing the raw material, the alkali metal chloride and an alkali metal silicate, followed by heating to the desired temperature. The ratio of chloride to silicate in the melt is not critical and the optimum ratio will depend on the nature of the metal-containing raw material, chloride and silicate, temperature of the melt, etc., and is best determined experimentally. Generally, however, a weight ratio of about 3 to 1 is satisfactory.

Addition of small quantities of phosphate, borate or fluoride salts or anhydrides to the melt is also desirable to enhance diffusion of metal ions from the silicate to the chloride phase. The added compound is mixed with the other components of the melt to distribute it between the two phases. Examples of suitable compounds are $NaPO_3$, $Na_4P_2O_7$, $B_2O_3$, $Na_2B_2O_4$, $Na_2B_4O_7$, $K_2B_2O_4$, $K_2B_4O_7$, NaF, KF, $KAlF_4$ and $Na_3AlF_6$. Suitable concentrations of these compounds will usually range from about 10 to 30 weight percent of the melt, with optimum concentrations best determined experimentally.

Electrolysis of the melt is conveniently performed in conventional apparatus comprising a graphite crucible which also serves as the anode. The cathode is a graphite rod centrally positioned in the cell and submerged only in the upper halide phase. The deposits formed by electrolyzing for a predetermined duration are scraped off the hot cathode. Adhering electrolyte is leached from the deposit with hot water or dilute acid solutions. Other types of conventional electrolytic cells may also be used, e.g., the cell could consist of a refractory container with metal or graphite electrodes.

Typical slags from the steel and ferroalloy industries, and their metal oxide contents, suitable for use in the process of the invention are shown in Table 1. Sodium silicate or sodium carbonate may be added to decrease the melting point of some slags. It is preferred that the melting point of the slags be less than 1,100°C since sodium chloride volatilizes excessively at temperatures over 1,100°C.

TABLE 1

| Type Operation | Major Oxide Values, weight-percent |
|---|---|
| Open hearth, steel | 10–20 MnO, 20–40 FeO |
| Bessemer, steel | 10–20 MnO, 20–40 FeO |
| Ferrochrome | 5–6 CrO |
| Ferrotungsten | 0.6 $WO_3$, 11 FeO |
| Ferromolybdenum | 0.3 $MoO_3$, 20 FeO |
| Ferromanganese | 22–25 MnO |
| Ferrotitanium | 24–27 $TiO_2$ |
| Ferrovanadium | 0.5 $V_2O_5$ |

The process of the invention may also be used for selectively electrodepositing different metals, e.g., iron may be deposited at about 1.0 volt, with manganese being deposited about 2.5 volts or greater.

The invention will be more specifically illustrated by the following example.

Example 200 grams of slag, containing in weight-percent: 42 $SiO_2$, 18 $Na_2O$, 11 FeO, 0.8 $WO_3$, and 14 MnO, was added to a 3-inch-inside-diameter graphite cell and heated to 1,000°C. A charge of 500 grams of NaCl and 150 grams each of $NaPO_3$ and $B_2O_3$ was then added to the cell.

After stabilizing the temperature at 1,000°C, a 1-inch graphite cathode was submerged in the halide melt to a depth of 2 inches. Electrolysis was then carried out in a series of four cycles under the conditions given in Table 2. After each cycle the deposit was withdrawn and scraped off the hot cathode and the cathode was then replaced in the cell for the succeeding cycle.

The electrolytic deposits were cleaned of adhering electrolyte by leaching in dilute HCl. The deposits were finally cleaned in a 2 percent NaOH solution. Results are shown in Table 2.

TABLE 2

| | Electrolysis | | | Deposit, weight, grams | |
|---|---|---|---|---|---|
| cycle | voltage | amperes | hours | Before leach | after leach |
| 1 | 1.0 | 5–7 | 4.5 | 22 | 3.9 |
| 2 | 2.0 | 10–14 | 4.5 | 44 | 12.4 |
| 3 | 3.0 | 30–52 | 4.0 | 109 | 7.0 |
| 4 | 4.0 | 70–90 | 4.0 | 120 | 11.7 |
| | | | Total | 345 | 35.0 |

Chemical Analyses of Leached Deposits, weight percent

| Cycle | Fe | Mn | W | P |
|---|---|---|---|---|

| | | | | |
|---|---|---|---|---|
| 1 | 61.1 | <0.1 | 15.5 | 18.7 |
| 2 | 73.9 | <0.1 | 3.5 | 19.7 |
| 3 | 45.4 | 10.1 | 0.2 | 32.4 |
| 4 | 3.5 | 55.5 | 0.1 | 35.0 |

Spectrographic analyses of leached deposits, p.p.m.

| Cycle | Al | Cr | Mo | Nb | Ni | Si | Sn | Ti | V |
|---|---|---|---|---|---|---|---|---|---|
| 1 | <20 | 700 | 3,000 | | 4,000 | 50 | | 100 | 100 |
| 2 | 100 | 1,400 | 2,000 | 700 | 800 | 100 | | 100 | 600 |
| 3 | 50 | 10,000 | 100 | 35,000 | 400 | 150 | 3,000 | 600 | 10,000 |
| 4 | 50 | 1,400 | | 35,000 | 40 | 110 | 1,000 | 30,000 | 1,400 |

Metal Recovery, Percent

| Cycle | Fe | Mn | W |
|---|---|---|---|
| 1 | 8.7 | | 37.5 |
| 2 | 35.0 | | 25.0 |
| 3 | 12.0 | 3.5 | |
| 4 | 1.5 | 33.0 | |
| Total | 57.2 | 36.5 | 62.5 |

Analysis of Electrolyte After Test, Percent

| | Fe | Mn |
|---|---|---|
| Upper phase | 0.10 | 0.22 |
| Lower phase | .20 | .73 |

What is claimed is:

1. A method of recovering iron, manganese, or refractory metals from ores or slags comprising (1) providing a melt consisting essentially of two immiscible liquid phases, said phases consisting of a chloride phase and a silicate phase, (2) providing a graphite cathode in contact with only the chloride phase and a graphite anode in contact with both the chloride phase and the silicate phase and (3) electrolyzing the melt to deposit the metals on the cathode.

2. The method of claim 1 in which the metals are derived from siliceous slags.

3. The method of claim 1 in which the chloride phase consists essentially of sodium chloride.

4. The method of claim 1 in which the melt is maintained at a temperature of about 1,000° to 1,100°C during electrodeposition.

5. The method of claim 1 in which the melt also contains an alkali phosphate, borate or fluoride salt or an anhydride of phosphoric or boric acids in an amount sufficient to enhance diffusion of the metal into the chloride phase.

6. The method of claim 1 in which two or more metals are selectively electrodeposited by adjustment of the electrolyte cell voltage to suitable values.

* * * * *